US012601823B2

(12) United States Patent
Yoshihara

(10) Patent No.: US 12,601,823 B2
(45) Date of Patent: Apr. 14, 2026

(54) INFORMATION PROCESSING DEVICE, VEHICLE, INFORMATION PROCESSING METHOD, AND COMPUTER-READABLE STORAGE MEDIUM

(71) Applicant: TOYOTA JIDOSHA KABUSHIKI KAISHA, Toyota (JP)

(72) Inventor: Toru Yoshihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 18/378,936

(22) Filed: Oct. 11, 2023

(65) Prior Publication Data

US 2024/0151839 A1 May 9, 2024

(30) Foreign Application Priority Data

Nov. 4, 2022 (JP) ................................. 2022-177570

(51) Int. Cl.
*G01S 11/02* (2010.01)

(52) U.S. Cl.
CPC ..................................... *G01S 11/02* (2013.01)

(58) Field of Classification Search
CPC ..... G01S 11/02; H04W 52/0245; H04W 4/80; H04W 64/00; H04W 4/02
See application file for complete search history.

(56) References Cited

U.S. PATENT DOCUMENTS

| | | | |
|---|---|---|---|
| 7,636,062 B2 * | 12/2009 | Ward | .................. G01S 5/02213 342/465 |
| 10,557,301 B2 * | 2/2020 | Budd | ........................ G07C 9/20 |
| 2013/0273938 A1 * | 10/2013 | Ng | ......................... H04W 64/00 455/456.1 |
| 2018/0099643 A1 | 4/2018 | Golsch et al. | |
| 2018/0103414 A1 | 4/2018 | Golsch | |
| 2019/0051072 A1 * | 2/2019 | Okada | ...................... H04W 4/40 |
| 2019/0263356 A1 | 8/2019 | Golsch et al. | |
| 2019/0263357 A1 | 8/2019 | Golsch | |
| 2020/0196095 A1 * | 6/2020 | Smith | ...................... H04W 4/02 |
| 2020/0247363 A1 | 8/2020 | Golsch et al. | |
| 2020/0254971 A1 | 8/2020 | Golsch | |

(Continued)

FOREIGN PATENT DOCUMENTS

| | | |
|---|---|---|
| CN | 115209345 A | 10/2022 |
| JP | 2021-063428 A | 4/2021 |
| WO | 2022/231113 A1 | 11/2022 |

*Primary Examiner* — Vladimir Magloire
*Assistant Examiner* — Kimberly Jenkins
(74) *Attorney, Agent, or Firm* — OLIFF PLC

(57) ABSTRACT

An information processing device includes: a distance measuring section that carries out communication between an own device and a portable terminal by using BLE wireless communication, and, in a case in which strength of a signal relating to the BLE wireless communication is greater than or equal to a predetermined threshold value, starts measuring a distance between the own device and the portable terminal by using UWB wireless communication; a judging section judging whether or not results of distance measuring by the UWB wireless communication satisfy a predetermined operation condition; and a notification section that, in a case in which the operation condition is satisfied, provides the portable terminal with a notice proposing changing of the threshold value.

18 Claims, 8 Drawing Sheets

(56)                References Cited

U.S. PATENT DOCUMENTS

| | | | |
|---|---|---|---|
| 2020/0307555 A1* | 10/2020 | Van Wiemeersch .. | B60W 30/06 |
| 2020/0366386 A1* | 11/2020 | Bugos .................. | A61B 5/0022 |
| 2021/0206347 A1 | 7/2021 | Golsch | |
| 2021/0245707 A1 | 8/2021 | Golsch et al. | |
| 2021/0383672 A1* | 12/2021 | Barovic ............. | H04W 64/006 |
| 2022/0191814 A1* | 6/2022 | Silverman ............ | H04W 24/08 |
| 2022/0322029 A1* | 10/2022 | Smith ................ | G07C 9/00309 |
| 2022/0386266 A1* | 12/2022 | Henry .................. | H04W 64/00 |
| 2023/0061183 A1* | 3/2023 | Asai ................... | G07C 9/00309 |
| 2023/0150452 A1 | 5/2023 | Golsch | |
| 2023/0234538 A1 | 7/2023 | Golsch et al. | |
| 2023/0283985 A1 | 9/2023 | Kim et al. | |

* cited by examiner

INFORMATION PROCESSING DEVICE, VEHICLE, INFORMATION PROCESSING METHOD, AND COMPUTER-READABLE STORAGE MEDIUM

CROSS-REFERENCE TO RELATED APPLICATION

This application is based on and claims priority under 35 USC § 119 from Japanese Patent Application No. 2022-177570 filed on Nov. 4, 2022, the disclosure of which is incorporated by reference herein.

BACKGROUND

Technical Field

The present disclosure relates to an information processing device, a vehicle, an information processing method, and a computer-readable storage medium that control the searching for a portable terminal that can transmit instructions relating to a vehicle.

Related Art

Japanese Patent Application Laid-Open (JP-A) No. 2021-63428 (Patent Document 1) discloses a digital key system that determines the position of a portable terminal by using UWB (Ultra Wide Band) wireless communication, and, on the basis of the position of the portable terminal, receives instructions for vehicle functions such as unlocking the doors, starting the engine, and the like, from the portable terminal by using BLE (Bluetooth Low Energy).

In the digital key system of Patent Document 1, communication between the portable terminal and the vehicle is established by BLE wireless communication. Thereafter, it is sensed that the portable terminal is positioned in a vicinity of the vehicle due to the distance to the portable terminal being measured by using UWB wireless communication, and thereafter, the measuring of the distance to the portable terminal by UWB wireless communication is started.

By the way, there are cases in which the accuracy of distance measuring by BLE wireless communication is poor as compared with distance measuring by UWB wireless communication. Further, the accuracy of distance measuring by BLE wireless communication varies in accordance with the performance of the portable terminal and the environment at the periphery of the vehicle. Therefore, in consideration of the performance of the portable terminal and the environment at the periphery of the vehicle and the like, there are cases in which it is difficult to maintain uniform the accuracy of distance measurement by BLE wireless communication. Namely, in a case of carrying out distance measuring by UWB wireless communication in accordance with the results of distance measurement by BLE wireless communication, there is the concern that the portable terminal will be sensed erroneously, and superfluous distance measurement by UWB wireless communication will be carried out.

SUMMARY

An object of the present disclosure is to provide an information processing device, a vehicle, an information processing method, and a computer-readable storage medium that, in a case in which distance measurement by UWB wireless communication is carried out in accordance with results of distance measurement by BLE wireless communication, can suppress the execution of superfluous distance measurement by UWB wireless communication.

An information processing device relating to a first aspect includes: a distance measuring section that carries out communication between an own device and a portable terminal by using BLE wireless communication, and, in a case in which strength of a signal relating to the BLE wireless communication is greater than or equal to a predetermined threshold value, starts measuring a distance between the own device and the portable terminal by using UWB wireless communication; a judging section judging whether or not results of distance measuring by the UWB wireless communication satisfy a predetermined operation condition; and a notification section that, in a case in which the operation condition is satisfied, provides the portable terminal with a notice proposing changing of the threshold value.

In a case in which the strength of the signal in the BLE wireless communication is greater than or equal to a predetermined threshold value, the information processing device relating to the first aspect starts measuring the distance to the portable terminal by UWB wireless communication. In a case in which the results of distance measuring by the UWB wireless communication satisfy a predetermined operation condition, the information processing device notifies the portable terminal that the threshold value should be changed. Namely, in accordance with this information processing device, in a case of carrying out distance measuring by UWB wireless communication in accordance with the results of distance measurement by BLE wireless communication, superfluous execution of distance measurement by UWB wireless communication can be suppressed.

In an information processing device relating to a second aspect, in the information processing device relating to the first aspect, the judging section carries out judgment by using, as the operation condition, at least one of whether or not a continuation time of distance measuring by the UWB wireless communication is greater than or equal to a predetermined time, and whether or not a frequency of distance measuring by the UWB wireless communication is greater than or equal to a predetermined frequency.

In accordance with the information processing device relating to the second aspect, the condition for providing notice of the proposal can be changed.

In an information processing device relating to a third aspect, in the information processing device relating to the second aspect, after the distance measuring section starts distance measuring by the UWB wireless communication, in a case in which the strength of the signal is less than the predetermined threshold value, the distance measuring section stops distance measuring by the UWB wireless communication.

In accordance with the information processing device relating to the third aspect, consumption of electric power by UWB wireless communication can be suppressed.

In an information processing device relating to a fourth aspect, the information processing device relating to any one of the first through third aspects further includes: a receiving section receiving, from the portable terminal, a changed value for changing the threshold value; and a setting section setting, as the threshold value, the changed value that was received.

In accordance with the information processing device relating to the fourth aspect, the user can change the threshold value to a desired threshold value.

A vehicle relating to a fifth aspect includes the information processing device of any one of the first through fourth aspects, wherein, in a case in which operation of the own vehicle by a user is not detected, the information processing device judges whether or not the operation condition is satisfied.

In accordance with the vehicle relating to the fifth aspect, it is detected that the user is at a position at which he/she cannot operate the own vehicle, and changing of the threshold value can be proposed to the user.

In a vehicle relating to the sixth aspect, in the vehicle relating to the fifth aspect, the information processing device counts a number of times that distance measuring by the UWB wireless communication is started, and initializes the number of times in a case in which the operation is detected.

In accordance with the vehicle relating to the sixth aspect, notification of a superfluous proposal can be suppressed.

In an information processing method relating to a seventh aspect, a computer executes processings of: carrying out communication between an own device and a portable terminal by using BLE wireless communication, and, in a case in which strength of a signal relating to the BLE wireless communication is greater than or equal to a predetermined threshold value, starting measuring of a distance between the own device and the portable terminal by using UWB wireless communication; judging whether or not results of distance measuring by the UWB wireless communication satisfy a predetermined operation condition; and, in a case in which the operation condition is satisfied, providing the portable terminal with a notice proposing changing of the threshold value.

In a case in which the strength of the signal in the BLE wireless communication is greater than or equal to a predetermined threshold value, the information processing method relating to the seventh aspect starts measuring the distance to the portable terminal by UWB wireless communication. In a case in which the results of distance measuring by the UWB wireless communication satisfy a predetermined operation condition, the information processing method notifies the portable terminal that the threshold value should be changed. Namely, in accordance with this information processing method, in a case of carrying out distance measuring by UWB wireless communication in accordance with the results of distance measurement by BLE wireless communication, superfluous execution of distance measurement by UWB wireless communication can be suppressed.

An information processing program relating to an eighth aspect causes a computer to execute processings of: carrying out communication between an own device and a portable terminal by using BLE wireless communication, and, in a case in which strength of a signal relating to the BLE wireless communication is greater than or equal to a predetermined threshold value, starting measuring of a distance between the own device and the portable terminal by using UWB wireless communication; judging whether or not results of distance measuring by the UWB wireless communication satisfy a predetermined operation condition; and, in a case in which the operation condition is satisfied, providing the portable terminal with a notice proposing changing of the threshold value.

In a case in which the strength of the signal in the BLE wireless communication is greater than or equal to a predetermined threshold value, the computer, which executes the information processing program relating to the eighth aspect, starts measuring the distance to the portable terminal by UWB wireless communication. In a case in which the results of distance measuring by the UWB wireless communication satisfy a predetermined operation condition, the computer notifies the portable terminal that the threshold value should be changed. Namely, in accordance with this computer, in a case of carrying out distance measuring by UWB wireless communication in accordance with the results of distance measurement by BLE wireless communication, superfluous execution of distance measurement by UWB wireless communication can be suppressed.

In accordance with the present disclosure, in a case in which distance measurement by UWB wireless communication is carried out in accordance with results of distance measurement by BLE wireless communication, superfluous execution of distance measurement by UWB wireless communication can be suppressed.

DETAILED DESCRIPTION

A control system, which includes a control ECU (Electronic Control Unit) serving as the information processing device of the present disclosure, is described. The control ECU functions as a device that carries out control of searching for a portable terminal, which can transmit instructions relating to a vehicle, by using BLE (Bluetooth Low Energy) wireless communication and UWB (Ultra Wide Band) wireless communication.

(Control System)

Figure 1:
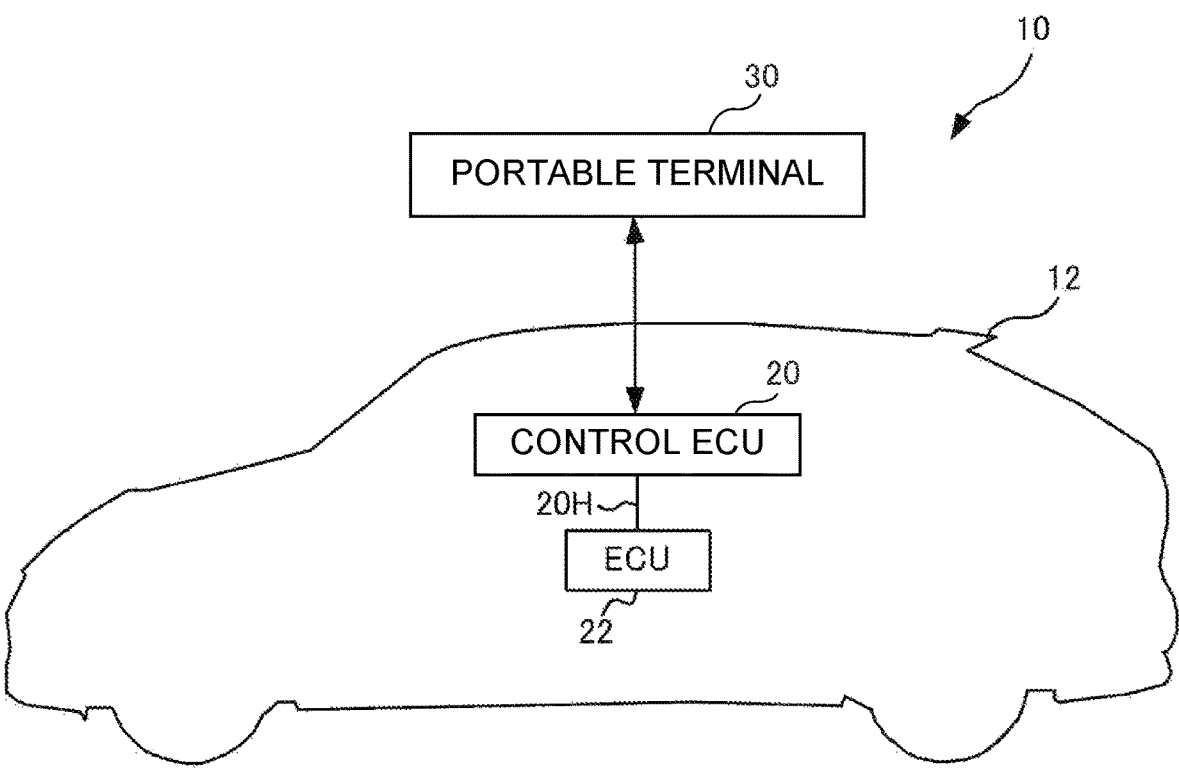
FIG. 1 is a drawing illustrating the schematic structure of a control system relating to a present embodiment.

As illustrated in FIG. 1, a control system 10 of the present embodiment is structured to include a vehicle 12 and a portable terminal 30. The vehicle 12 includes a control ECU 20 serving as an information processing device, and plural ECUs 22 that are devices controlling equipment installed in the vehicle 12. The control ECU 20 and the portable terminal 30 can be connected to one another by BLE wireless communication and UWB wireless communication.

The control ECU 20 has the function of acquiring communication information that are based on CAN (Controller Area Network) protocol and are transmitted from the respective ECUs 22. A body ECU that is described later is an example of the ECU 22 in the present embodiment. The control ECU 20 and the respective ECUs 22 are connected to one another via an external bus 20H.

The control ECU 20 carries out communication with the portable terminal 30 by using BLE wireless communication and UWB wireless communication. By using the strength of the signal in the BLE wireless communication, the control ECU 20 carries out measuring of the distance to the portable terminal 30. In a case in which the strength of this signal is greater than or equal to a predetermined threshold value (i.e., in a case in which the portable terminal 30 exists within a range of a predetermined distance), the control ECU 20 carries out UWB wireless communication. By using the propagation time of the signal by the UWB wireless communication, the control ECU 20 carries out measuring of the distance to the portable terminal 30 (TOA: Time of Arrival). Here, in a case in which the results of measurement by the UWB wireless communication satisfy a predetermined operation condition, the control ECU 20 transmits, to the portable terminal 30, a notification relating to a proposal to change the threshold value of the strength of the signal relating to the BLE wireless communication. Note that, hereinafter, the threshold value of the strength of the signal relating to the BLE wireless communication is called the "strength threshold value".

The portable terminal 30 is a terminal such as a smartphone or the like that can be carried by the owner of the vehicle 12. A digital key relating to the vehicle 12 is stored in advance in the portable terminal 30. By remote operation using the digital key, the portable terminal 30 can carry out operations such as locking of the doors, unlocking of the doors, and the like of the vehicle 12. When the portable terminal 30 receives a notification relating to changing the strength threshold value from the vehicle 12, the portable terminal 30 displays this notification on a monitor. The portable terminal 30 transmits to the control ECU 20 the value after the change of the threshold value inputted by the user (hereinafter called "changed value"). Note that the present embodiment describes a form in which the terminal that communicates with the vehicle 12 is the portable terminal 30 that the user carries. However, the present disclosure is not limited to this. For example, the terminal may be a terminal such as a tablet, a car navigation device, or the like, provided that it can be carried by the user.

Figure 2:
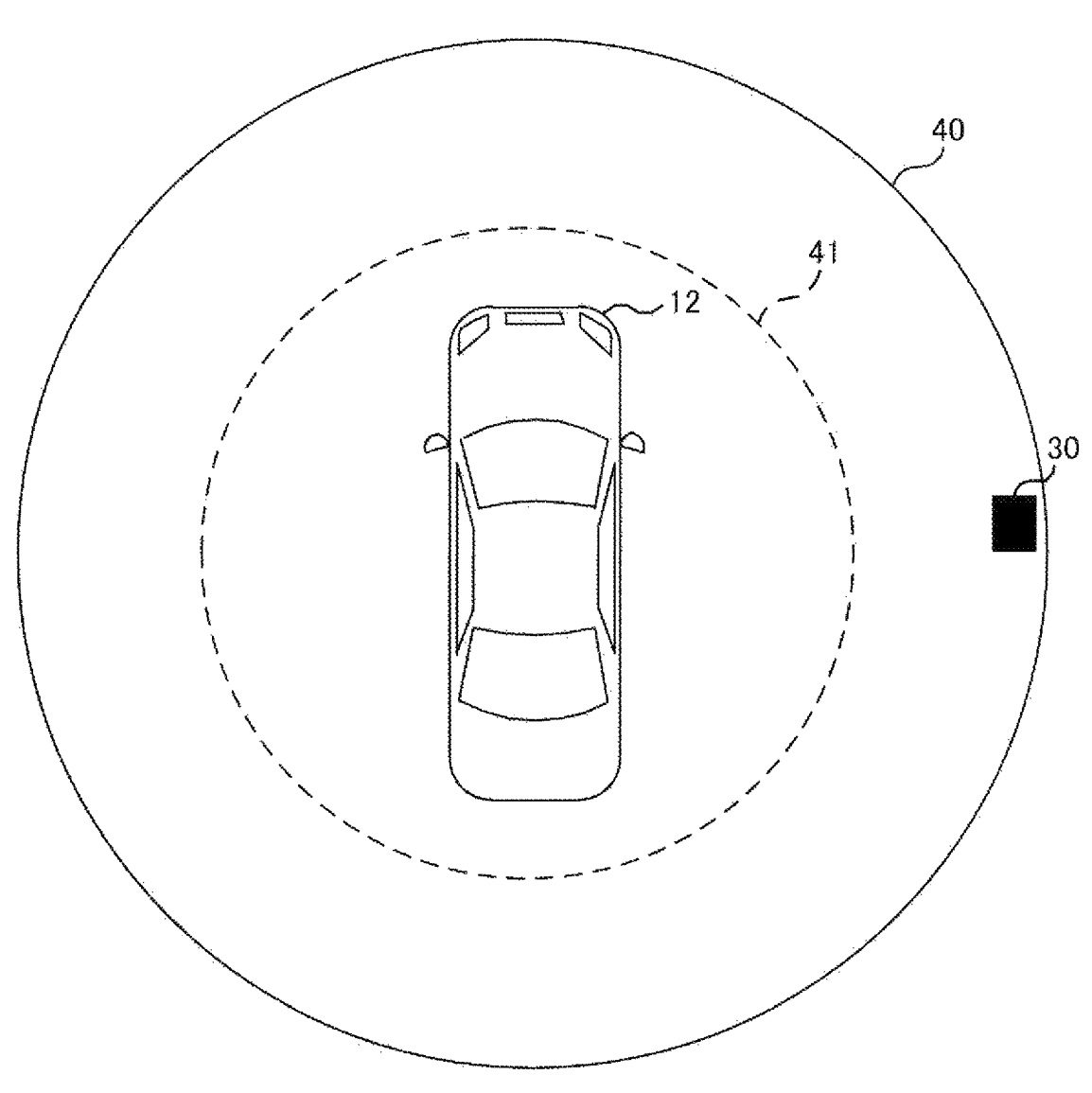
FIG. 2 is a schematic drawing illustrating an example of a range in which communication is possible in BLE wireless communication relating to the present embodiment.
Figure 3:
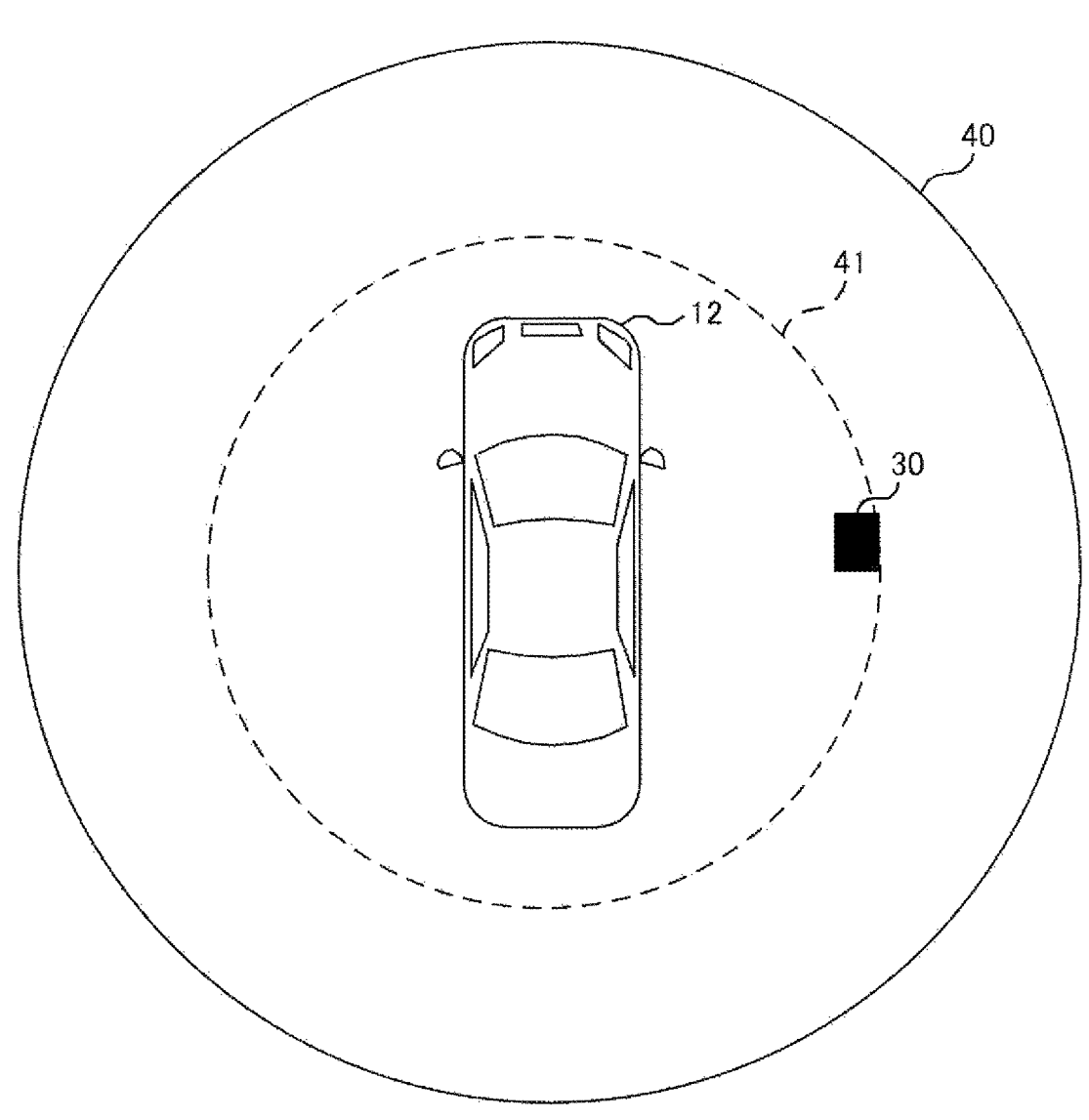
FIG. 3 is a schematic drawing illustrating an example of a range of a strength threshold value before changing, relating to the present embodiment.

As illustrated in FIG. 2 as an example, in a case in which the portable terminal 30 is included in a range 40 in which BLE wireless communication is possible, distance measurement by BLE wireless communication is carried out. Further, as illustrated in FIG. 3 as an example, in a case in which, due to the user who holds the portable terminal 30 approaching the vehicle 12, the portable terminal 30 is included in a range 41 that expresses the strength threshold value, distance measurement by UWB wireless communication is started.

Here, for example, in a case in which the vehicle 12 is parked in a parking spot that is adjacent to a building such as a house or the like, there are cases in which the user approaches the vehicle 12 even without the intent of getting into the vehicle 12, and the portable terminal 30 that the user is carrying is included in the range 40 and the range 41.

Figure 4:
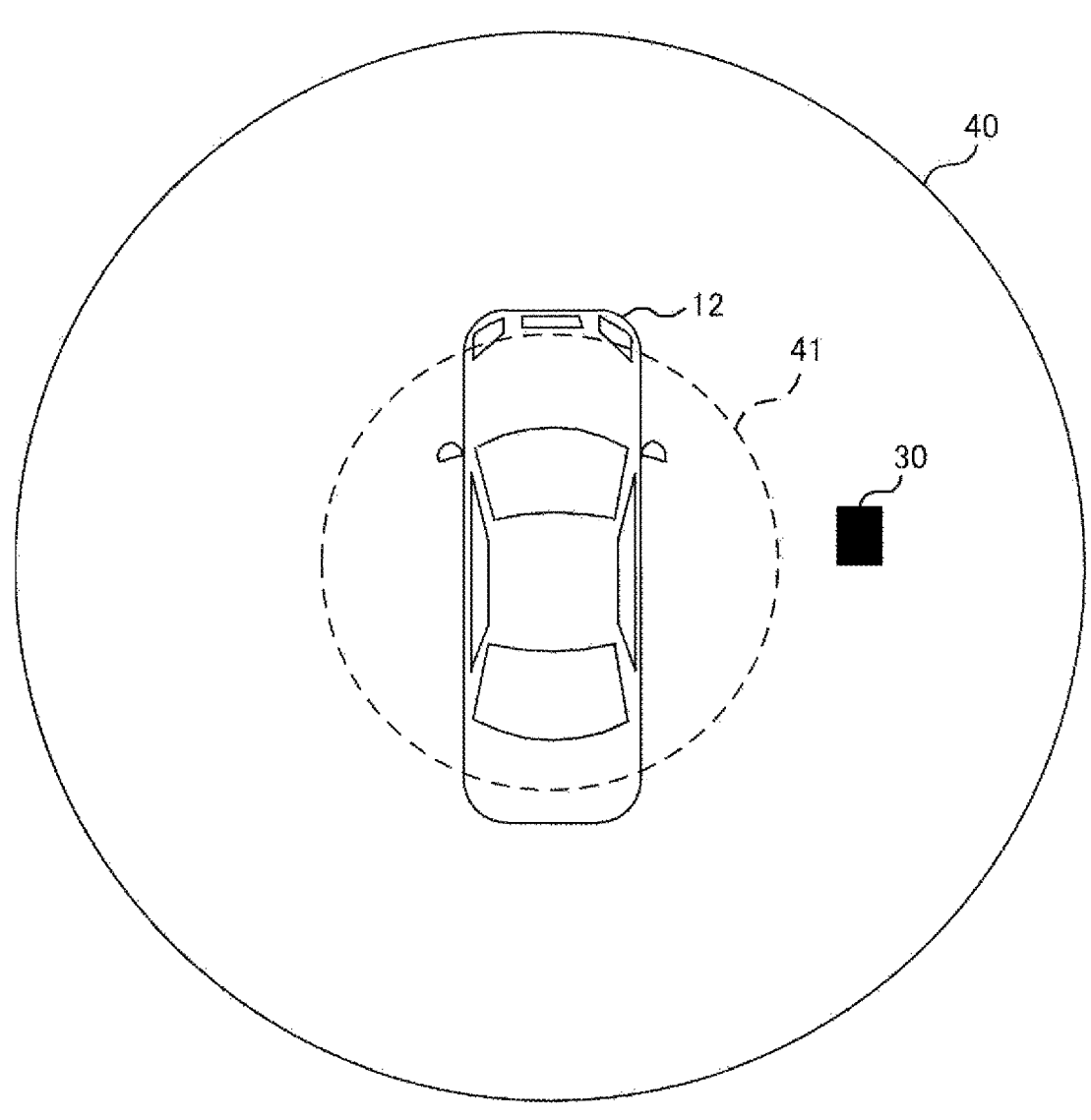
FIG. 4 is a schematic drawing illustrating an example of a range of the strength threshold value after changing, relating to the present embodiment.

Thus, due to the user transmitting a changed value to the control ECU 20 and changing the strength threshold value in response to the notification by the control ECU 20, as illustrated in FIG. 4 as an example, the portable terminal becomes located outside of the range 41 expressing the strength threshold value. Namely, distance measurement by UWB wireless communication is no longer carried out.

Figure 5:
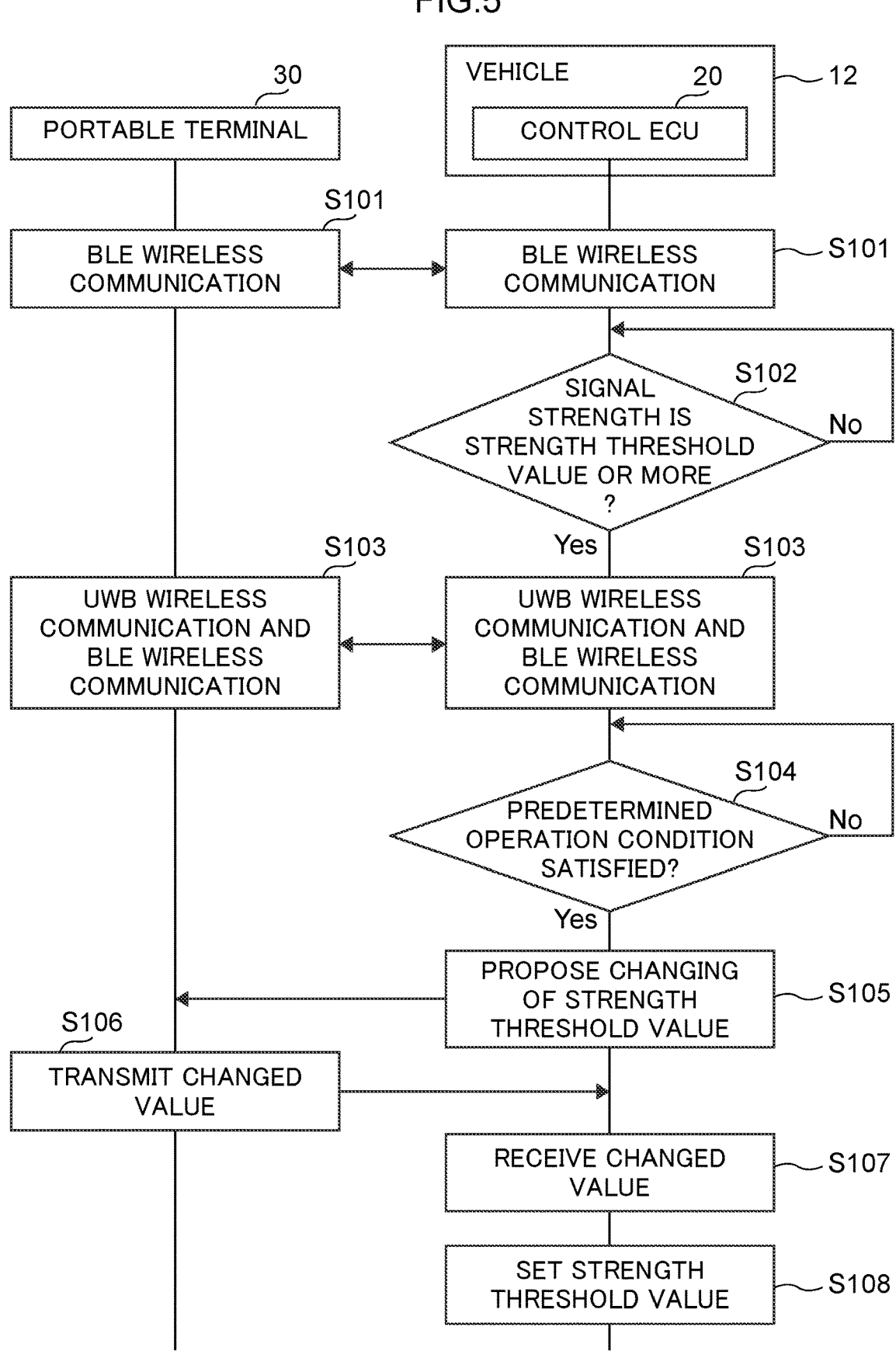
FIG. 5 is a sequence diagram illustrating the flow of processings executed in the control system relating to the present embodiment.

FIG. 5 that is illustrated as an example is a sequence diagram showing an example of processings executed by the control ECU 20 and the portable terminal 30 cooperating.

As illustrated in FIG. 5, the control ECU 20 and the portable terminal 30 carry out BLE wireless communication (step S101).

The control ECU 20 judges whether or not the strength of the signal in the BLE wireless communication is greater than or equal to the strength threshold value (step S102). If the strength of the signal is greater than or equal to the strength threshold value (step S102: Yes), the control ECU 20 moves on to step S103. On the other hand, if the strength of the signal is not greater than or equal to the strength threshold value (i.e., if the strength of the signal in the BLE wireless communication is less than the strength threshold value) (step S102: No), the control ECU 20 stands-by until the strength of the signal becomes greater than or equal to the strength threshold value.

The control ECU 20 and the portable terminal 30 carry out BLE wireless communication and UWB wireless communication (step S103).

The control ECU 20 judges whether or not a predetermined operation condition in the UWB wireless communication is satisfied (step S104). If the predetermined operation condition is satisfied (step S104: Yes), the control ECU 20 moves on to step S105. On the other hand, if the predetermined operation condition is not satisfied (step S104: No), the control ECU 20 continues the BLE wireless communication and the UWB wireless communication.

The control ECU 20 provides the portable terminal 30 with notice of a proposal to change the strength threshold value (step S105).

After receiving the notification, the portable terminal 30 transmits the changed value, which was inputted by the user, to the control ECU 20 (step S106).

The control ECU 20 receives the changed value from the portable terminal 30 (step S107), and sets the received, changed value as the strength threshold value (step S108).

(Vehicle)

Figure 6:
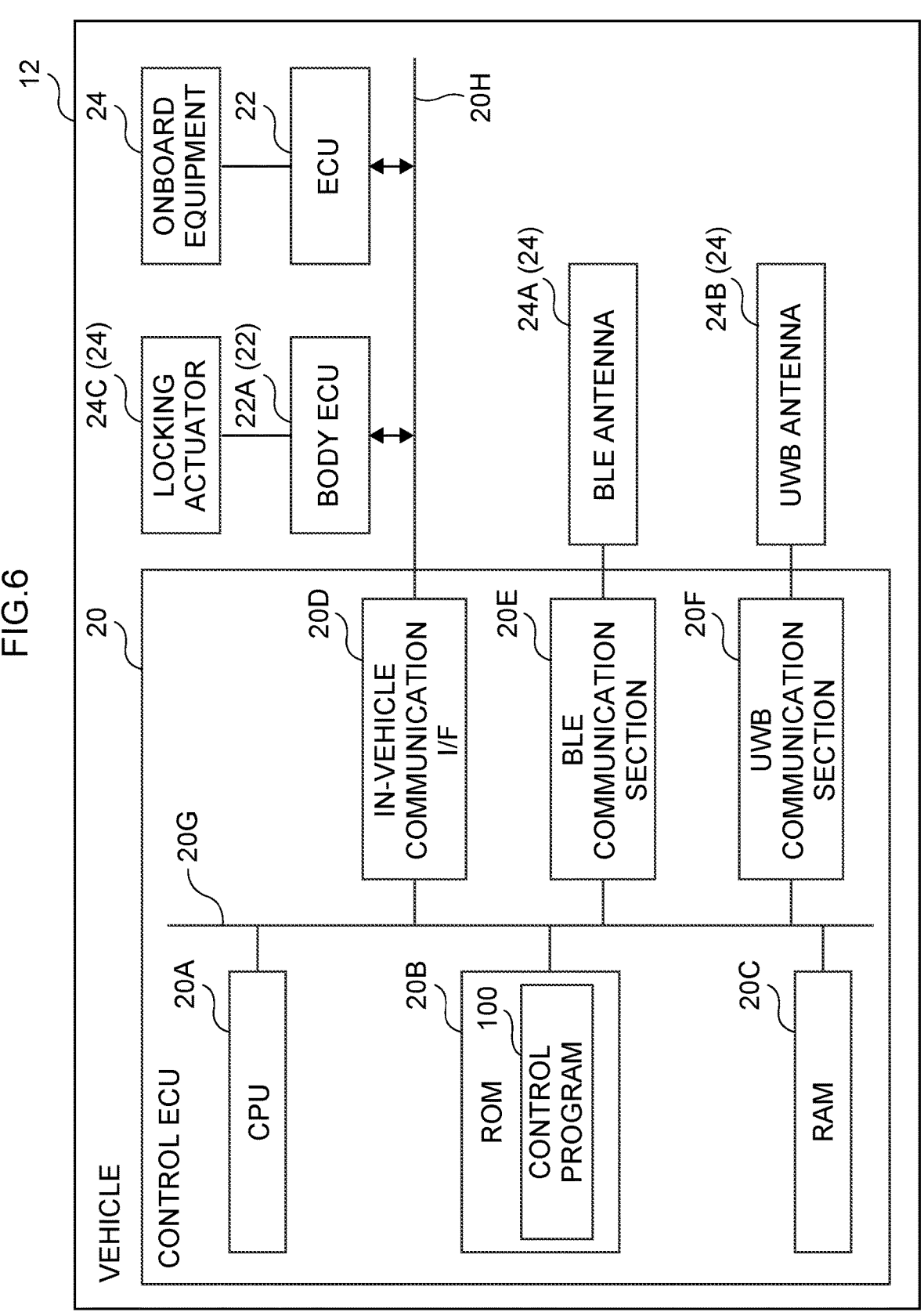
FIG. 6 is a block drawing illustrating hardware structures of a vehicle relating to the present embodiment.

As illustrated in FIG. 6, the vehicle 12 relating to the present embodiment is structured to include the control ECU 20, the plural ECUs 22 and plural onboard equipment 24.

The control ECU 20 is structured to include a CPU (Central Processing Unit) 20A, a ROM (Read Only Memory) 20B, a RAM (Random Access Memory) 20C, an in-vehicle communication I/F (Interface) 20D, a BLE communication section 20E and a UWB communication section 20F. The CPU 20A, the ROM 20B, the RAM 20C, the in-vehicle communication I/F 20D, the BLE communication section 20E and the UWB communication section 20F are connected so as to be able to communicate with one another via an internal bus 20G.

The CPU 20A is a central computing processing unit, and executes various programs and controls respective sections. Namely, the CPU 20A reads-out a program from the ROM 20B, and executes the program by using the RAM 20C as a workspace.

The ROM 20B stores various programs and various data. A control program 100, which executes a processing that controls the searching for the portable terminal 30, is stored in the ROM 20B of the present embodiment. The RAM 20C temporarily stores programs and data as a workspace.

The in-vehicle communication I/F 20D is an interface for connection with the respective ECUs 22. Communication standards in accordance with CAN protocol are used at this interface. The in-vehicle communication I/F 20D is connected to the external bus 20H.

A BLE antenna 24A is connected to the BLE communication section 20E. The BLE communication section 20E is a wireless communication module for communicating, via the BLE antenna 24A, with equipment such as the portable terminal 30 and the like. The BLE antenna 24A is communication equipment that carries out wireless communication of, for example, the Bluetooth frequency band (2.4 GHz), and transmits request signals to the portable terminal 30 and receives response signals from the portable terminal 30.

A UWB antenna 24B is connected to the UWB communication section 20F. The UWB communication section 20F is a wireless communication module for communicating, via the UWB antenna 24B, with equipment such as the portable terminal 30 and the like. The UWB antenna 24B is communication equipment that carries out wireless communication by using, for example, pulse-shaped radio signals of an ultrawide band (e.g., from 3.1 GHz to 10.6 GHz), and transmits request signals to the portable terminal 30 and receives response signals from the portable terminal 30.

The ECUs 22 include a body ECU 22A. The body ECU 22A controls the respective sections of the body of the vehicle 12. A locking actuator 24C that structures the onboard equipment 24 is connected to the body ECU 22A. In accordance with instructions to lock and unlock the doors of the vehicle 12, the body ECU 22A executes locking and unlocking of the doors of the vehicle 12. In accordance with instructions, the locking actuator 24C carries out locking and unlocking of the doors. Here, in a case in which an operation to open a door of the vehicle 12 is carried out by the user, the body ECU 22A relating to the present embodiment notifies the control ECU 20 that a door has been operated.

Figure 7:
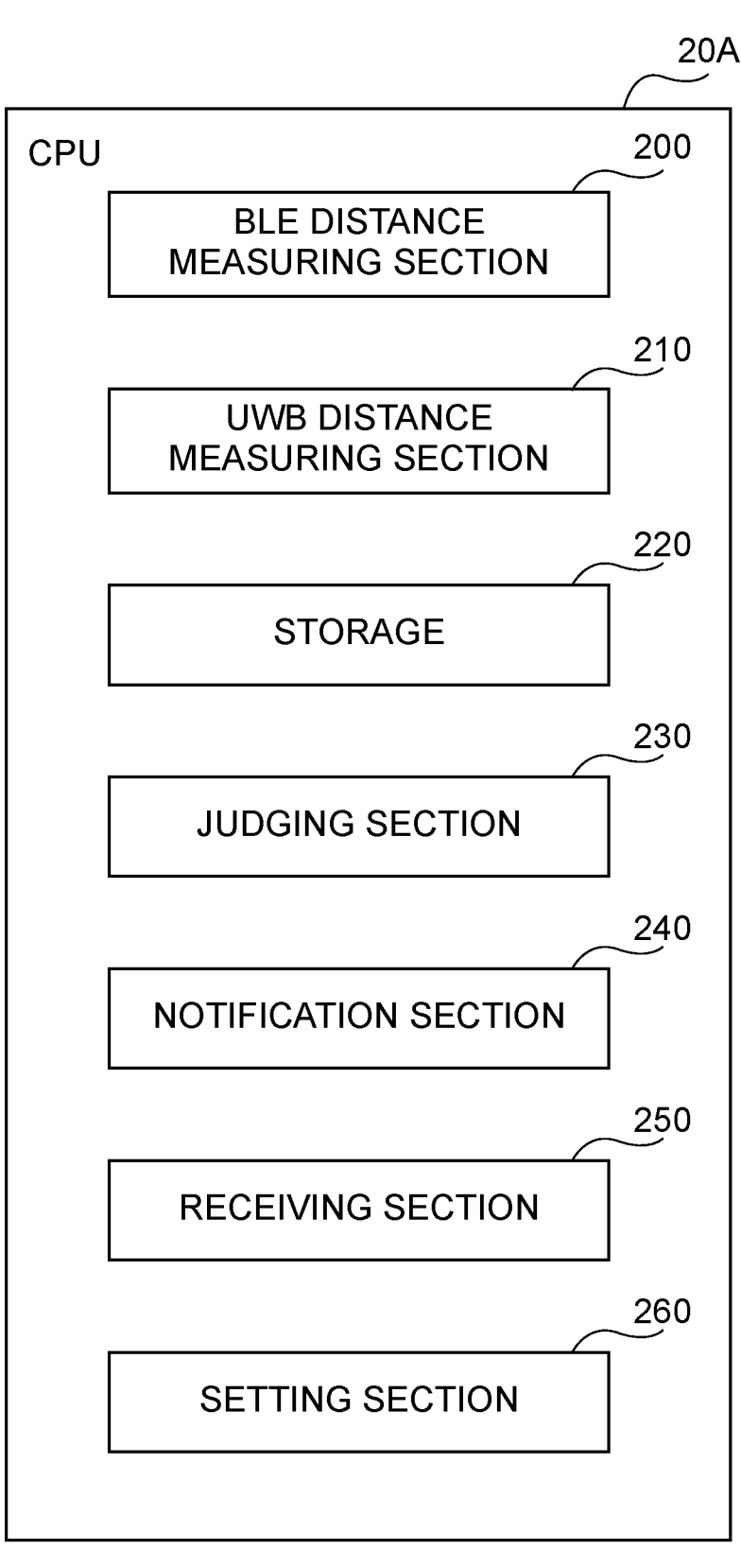
FIG. 7 is a block drawing illustrating functional structures of a control ECU relating to the present embodiment.

As illustrated in FIG. 7, at the control ECU 20 of the present embodiment, due to the CPU 20A executing the control program 100, the CPU 20A functions as a BLE distance measuring section 200, a UWB distance measuring section 210, a storage 220, a judging section 230, a notification section 240, a receiving section 250 and a setting section 260.

The BLE distance measuring section 200 measures the distance to the portable terminal 30 by using the strength of the signal in the BLE wireless communication. Specifically, the BLE distance measuring section 200 measures the distance to the portable terminal 30 in accordance with the strength of the signal received from the portable terminal 30 (RSSI: Received Signal Strength Indication) in the BLE wireless communication.

In a case in which the strength of the signal received by the BLE wireless communication is greater than or equal to the strength threshold value, the UWB distance measuring section 210 carries out communication with the portable terminal 30, and starts measuring the distance to the portable terminal 30 by UWB wireless communication. Here, after the UWB distance measuring section 210 starts distance measuring by UWB wireless communication, if the strength of the signal in the BLE wireless communication becomes less than the strength threshold value, the UWB distance measuring section 210 stops the distance measuring by the UWB wireless communication.

The storage 220 counts the number of times that distance measuring by the UWB distance measuring section 210 is stopped (hereinafter called "number of times of stoppage"), and stores the number of times of stoppage. Further, the storage 220 measures the time over which distance measurement by the UWB distance measuring section 210 was continued, and stores this continuation time. Note that, in the present embodiment, a form is described in which the storage 220 counts the number of times of stoppage in which distance measuring is stopped up until the vehicle 12 is operated or the strength threshold value is changed, as the frequency of stoppages of distance measuring by the UWB distance measuring section 210. However, the present disclosure is not limited to this. The storage 220 may count the total number of times that distance measuring is stopped, or may count the number of times that distance measuring is stopped within a predetermined time period.

The judging section 230 judges whether or not a predetermined operation condition in the UWB wireless communication is satisfied. Here, the operation condition is that there is a case in which the number of times of stoppage in which the distance measuring by the UWB distance measuring section 210 is stopped is greater than or equal to a predetermined number of times, and a case in which the continuation time of the distance measuring by the UWB distance measuring section 210 is greater than or equal to a predetermined time.

Further, the judging section 230 judges whether or not a notification that a door of the vehicle 12 has been operated has been transmitted from the body ECU 22A.

In a case in which the predetermined operation condition in the UWB wireless communication is satisfied, the notification section 240 provides the portable terminal 30 with a notification that proposes changing of the strength threshold value. Specifically, in a case in which no notification has been transmitted from the body ECU 22A, if the number of times of stoppage in which the distance measurement by the UWB distance measuring section 210 was stopped is greater than or equal to a predetermined number of times, or if the continuation time of the distance measurement by the UWB distance measuring section 210 is greater than or equal to a predetermined time, the notification section 240 notifies the portable terminal 30. Note that the present embodiment describes a form in which notification is given if the number of times of stoppage is greater than or equal to a predetermined number of times, or if the continuation time is greater than or equal to a predetermined time. However, the present disclosure is not limited to this. Notification may be given if the number of times of stoppage is greater than or equal to a predetermined number of times and the continuation time is greater than or equal to a predetermined time.

The receiving section 250 receives the changed value from the portable terminal 30. Specifically, after the portable terminal 30 is notified of a proposal to change the strength threshold value, the receiving section 250 receives the changed value for changing the strength threshold value.

The setting section 260 sets the received, changed value as the strength threshold value. Execution of distance measurement by UWB wireless communication is suppressed due to the changed value, which is received from the portable terminal 30, being set as the strength threshold value.

(Flow of Processing)

Figure 8:
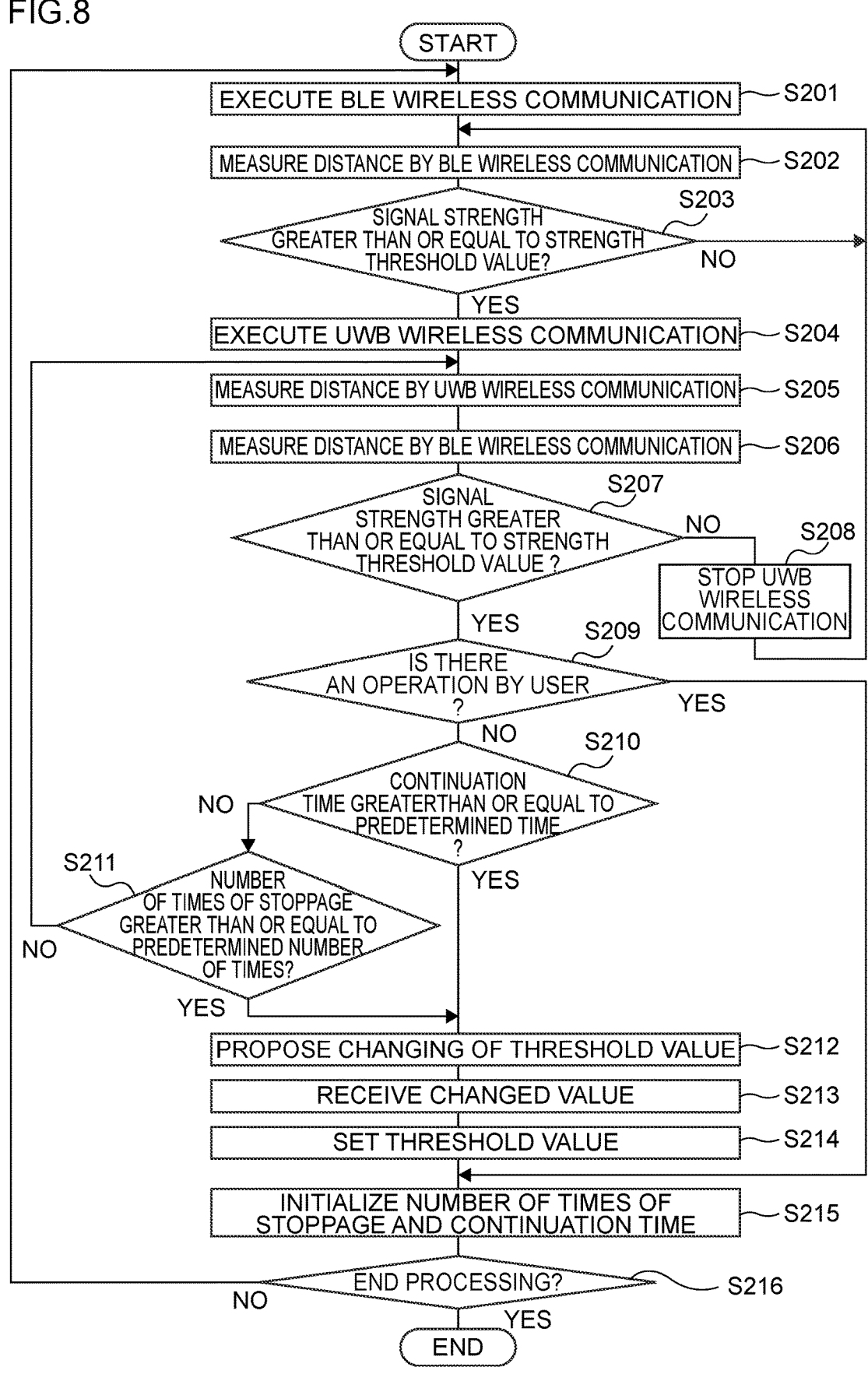
FIG. 8 is a flowchart illustrating the flow of processings executed at the control ECU relating to the present embodiment.

Operation of the control ECU 20 relating to the present embodiment is described next with reference to FIG. 8. FIG. 8 is a flowchart illustrating an example of the flow of the control processing relating to the present embodiment. The control processing illustrated in FIG. 8 is executed due to the CPU 20A reading-out the control program 100 from the ROM 20B and executing the control program 100. The control processing illustrated in FIG. 8 is executed, for example, in a case in which the control ECU 20 detects the portable terminal 30.

In step S201, the CPU 20A executes BLE wireless communication with the portable terminal 30. Note that the CPU 20A continues to execute BLE wireless communication hereinafter.

In step S202, by using the strength of the signal in the BLE wireless communication, the CPU 20A measures the distance to the portable terminal 30.

In step S203, the CPU 20A judges whether or not the strength of the signal in the BLE wireless communication is greater than or equal to the strength threshold value. If the strength of the signal is greater than or equal to the strength threshold value (step S203: YES), the CPU 20A moves on to step S204. On the other hand, if the strength of the signal is not greater than or equal to the strength threshold value (i.e., if the strength of the signal is less than the strength threshold value) (step S203: NO), the CPU 20A moves on to step S202 and continues the distance measuring by BLE wireless communication.

In step S204, the CPU 20A executes UWB wireless communication with the portable terminal 30.

In step S205, by using the propagation time of the signal in the UWB wireless communication, the CPU 20A measures the distance to the portable terminal 30. Here, the CPU 20A measures the continuation time of the distance measuring, and stores the continuation time.

In step S206, the CPU 20A measures the distance to the portable terminal 30 by using the strength of the signal in the BLE wireless communication.

In step S207, the CPU 20A judges whether or not the strength of the signal in the BLE wireless communication is greater than or equal to the strength threshold value. If the strength of the signal is greater than or equal to the strength threshold value (step S207: YES), the CPU 20A moves on to step S209. On the other hand, if the strength of the signal is not greater than or equal to the strength threshold value (i.e., if the strength of the signal is less than the strength threshold value) (step S207: NO), the CPU 20A moves on to step S208.

In step S208, the CPU 20A cuts-off the UWB wireless communication with the portable terminal 30, and stops the distance measuring by UWB wireless communication. Here, the CPU 20A sets the continuation time to 0, and adds 1 to the number of times of stoppage.

In step S209, the CPU 20A judges whether or not there has been an operation of the vehicle 12 by the user. If there has been an operation of the vehicle 12 by the user (step S209: YES), the CPU 20A moves on to step S215. On the other hand, if there has not been an operation of the vehicle 12 by the user (step S209: NO), the CPU 20A moves on to step S210.

In step S210, the CPU 20A judges whether or not the continuation time of the distance measurement by the UWB wireless communication is greater than or equal to a predetermined time. If the continuation time is greater than or equal to a predetermined time (step S210: YES), the CPU 20A moves on to step S212. On the other hand, if the continuation time is not greater than or equal to the predetermined time (i.e., if the continuation time is less than the predetermined time) (step S210: NO), the CPU 20A moves on to step S211.

In step S211, the CPU 20A judges whether or not the number of times of stoppage of the distance measuring by the UWB wireless communication is greater than or equal to a predetermined number of times. If the number of times of stoppage is greater than or equal to the predetermined number of times (step S211: YES), the CPU 20A moves on to step S212. On the other hand, if the number of times of stoppage is not greater than or equal to the predetermined number of times (i.e., if the number of times of stoppage is less than the predetermined number of times) (step S211: NO), the CPU 20A moves on to step S205, and continues the distance measuring by UWB wireless communication.

In step S212, the CPU 20A provides the portable terminal 30 with notice of a proposal to change the strength threshold value.

In step S213, the CPU 20A receives the changed value from the portable terminal 30.

In step S214, the CPU 20A sets the received, changed value as the strength threshold value.

In step S215, the CPU 20A initializes the continuation time and the number of times of stoppage.

In step S216, the CPU 20A judges whether or not processing is to be ended. If processing is to be ended (step S216: YES), the CPU 20A ends the processing. On the other hand, if processing is not to be ended (step S216: NO), the CPU 20A moves on to step S201 and executes BLE wireless communication with the portable terminal 30.

(Overview of Embodiment)

In a case in which the strength of the signal in BLE wireless communication is greater than or equal to a predetermined threshold value, the control ECU 20 of the present embodiment starts measuring the distance to the portable terminal by UWB wireless communication. In a case in which the results of the distance measuring by the UWB wireless communication satisfy a predetermined operation condition, the control ECU 20 provides the portable terminal with a notice proposing changing of the threshold value.

As described above, in accordance with the present embodiment, in a case in which distance measurement by UWB wireless communication is carried out in accordance with the results of distance measurement by BLE wireless communication, superfluous execution of distance measurement by UWB wireless communication can be suppressed.

[Notes]

Note that any of various types of processors other than a CPU may execute the processings that are executed due to the CPU 20A reading-in software (programs) in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above embodiment describes a form in which the programs are stored in advance (installed) on a computer-readable, non-transitory recording medium. For example, the control program 100 at the CPU 20A is stored in advance in the ROM 20B. However, the present disclosure is not limited to this, and the programs may be provided in forms of being recorded on a non-transitory recording medium such as a CD-ROM (Compact Disk Read Only Memory), a DVD-ROM (Digital Versatile Disk Read Only Memory), a USB (Universal Serial Bus) memory or the like. Further, the programs may be in forms of being downloaded from an external device via a network.

What is claimed is:
1. An information processing device comprising:
at least one processor that is configured to:

(i) carry out communication between an own device and a portable terminal by using Bluetooth Low Energy (BLE) wireless communication, (ii) compare a strength of a signal relating to the BLE wireless communication between the own device and the portable terminal with a predetermined threshold value and, (iii) in a case in which the strength of the signal relating to the BLE wireless communication is greater than or equal to the predetermined threshold value, start measuring a distance between the own device and the portable terminal by using Ultra Wide Band (UWB) wireless communication;

judge whether or not results of distance measuring by the UWB wireless communication satisfy a predetermined operation condition; and in a case in which the predetermined operation condition is satisfied, provide the portable terminal with a notice proposing changing of the predetermined threshold value to which the strength of the signal relating to the BLE wireless communication is compared.

2. The information processing device of claim 1, wherein the predetermined operation condition is at least one of whether or not a continuation time of the distance measuring by the UWB wireless communication is greater than or equal to a predetermined time, and whether or not a frequency of the distance measuring by the UWB wireless communication is greater than or equal to a predetermined frequency.

3. The information processing device of claim 2, wherein, after the at least one processor starts the distance measuring by the UWB wireless communication, in a case in which the strength of the signal becomes less than the predetermined threshold value, the at least one processor stops the distance measuring by the UWB wireless communication.

4. The information processing device of claim 1, wherein the at least one processor is further configured to:

receive, from the portable terminal, a changed value for changing the predetermined threshold value; and set, as the predetermined threshold value, the changed value that was received from the portable terminal.

5. A vehicle comprising the information processing device claim 1, wherein, in a case in which operation of the vehicle by a user is not detected, the information processing device judges whether or not the predetermined operation condition is satisfied.

6. A vehicle comprising the information processing device of claim 2, wherein, in a case in which operation of the vehicle by a user is not detected, the information processing device judges whether or not the predetermined operation condition is satisfied.

7. A vehicle comprising the information processing device of claim 3, wherein, in a case in which operation of the vehicle by a user is not detected, the information processing device judges whether or not the predetermined operation condition is satisfied.

8. A vehicle comprising the information processing device of claim 4, wherein, in a case in which operation of the vehicle by a user is not detected, the information processing device judges whether or not the predetermined operation condition is satisfied.

9. The vehicle of claim 5, wherein the information processing device counts a number of times that the distance measuring by the UWB wireless communication is started, and initializes the number of times in a case in which the operation of the vehicle by the user is detected.

10. The vehicle of claim 6, wherein the information processing device counts a number of times that the distance measuring by the UWB wireless communication is started, and initializes the number of times in a case in which the operation of the vehicle by the user is detected.

11. The vehicle of claim 7, wherein the information processing device counts a number of times that the distance measuring by the UWB wireless communication is started, and initializes the number of times in a case in which the operation of the vehicle by the user is detected.

12. The vehicle of claim 8, wherein the information processing device counts a number of times that the distance measuring by the UWB wireless communication is started, and initializes the number of times in a case in which the operation of the vehicle by the user is detected.

13. The information processing device of claim 1, wherein the predetermined operation condition is whether or not the measuring of the distance between the own device and the portable terminal by the UWB wireless communication has been performed, without the user operating the own device, for at least one of (a) a time period that is greater than or equal to a predetermined time period and (b) a number of times that is greater than or equal to a predetermined number of times.

14. An information processing method in which a computer executes processings of:

(i) carrying out communication between an own device and a portable terminal by using Bluetooth Low Energy (BLE) wireless communication, (ii) comparing a strength of a signal relating to the BLE wireless communication between the own device and the portable terminal with a predetermined threshold value and, (iii) in a case in which the strength of the signal relating to the BLE wireless communication is greater than or equal to the predetermined threshold value, starting measuring of a distance between the own device and the portable terminal by using Ultra Wide Band (UWB) wireless communication;

judging whether or not results of distance measuring by the UWB wireless communication satisfy a predetermined operation condition; and in a case in which the predetermined operation condition is satisfied, providing the portable terminal with a notice proposing changing of the predetermined threshold value to which the strength of the signal relating to the BLE wireless communication is compared.

15. The information processing method of claim 14, wherein the computer further executes the processing of:

upon receipt of an instruction to change the predetermined threshold value, the instruction being output by the portable terminal in response to the notice, changing a value of the predetermined threshold value so that the measuring of the distance between the own device and the portable terminal using the UWB wireless communication is started when the portable terminal is located closer to the own device compared to before the value of the predetermined threshold value was changed.

16. A non-transitory computer-readable storage medium storing an information processing program for causing a computer to execute processings of:

(i) carrying out communication between an own device and a portable terminal by using Bluetooth Low Energy (BLE) wireless communication, (ii) comparing a strength of a signal relating to the BLE wireless communication between the own device and the portable terminal with a predetermined threshold value and, (iii) in a case in which the strength of the signal relating to the BLE wireless communication is greater than or equal to the predetermined threshold value, starting measuring of a distance between the own device and the portable terminal by using Ultra Wide Band (UWB) wireless communication;

judging whether or not results of distance measuring by the UWB wireless communication satisfy a predetermined operation condition; and in a case in which the predetermined operation condition is satisfied, providing the portable terminal with a notice proposing changing of the predetermined threshold value to which the strength of the signal relating to the BLE wireless communication is compared.

17. The information processing device of claim 1, wherein the at least one processor is further configured to:

upon receipt of an instruction to change the predetermined threshold value, the instruction being output by the portable terminal in response to the notice, change a value of the predetermined threshold value so that the measuring of the distance between the own device and the portable terminal using the UWB wireless communication is started when the portable terminal is located closer to the own device compared to before the value of the predetermined threshold value was changed.

18. The information processing method of claim 14, wherein the predetermined operation condition is whether or not the measuring of the distance between the own device and the portable terminal by the UWB wireless communication has been performed, without the user operating the own device, for at least one of (a) a time period that is greater than or equal to a predetermined time period and (b) a number of times that is greater than or equal to a predetermined number of times.

* * * * *